United States Patent
Birman et al.

(10) Patent No.: US 9,632,230 B2
(45) Date of Patent: Apr. 25, 2017

(54) LIGHT GUIDE ASSEMBLY FOR DISPLAY ILLUMINATION

(71) Applicant: Continental Automotive Systems, Inc., Auburn Hills, MI (US)

(72) Inventors: Vyacheslav Borisovich Birman, Auburn Hills, MI (US); Richard Daniel Sanders, Clarkston, MI (US)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 270 days.

(21) Appl. No.: 14/269,680

(22) Filed: May 5, 2014

(65) Prior Publication Data

US 2015/0316708 A1    Nov. 5, 2015

(51) Int. Cl.
G02B 6/42 (2006.01)
F21V 8/00 (2006.01)
G01D 11/28 (2006.01)

(52) U.S. Cl.
CPC ........... G02B 6/0051 (2013.01); G01D 11/28 (2013.01); *G02B 6/0018* (2013.01); *G02B 6/0045* (2013.01); *G02B 6/0053* (2013.01)

(58) Field of Classification Search
CPC .......... B60Q 3/04; B60Q 3/044; G01D 11/28; G02B 6/002; G02B 6/0025; G02B 6/0045

USPC ...................... 362/23.01, 23.07, 23.09, 23.16
See application file for complete search history.

(56) References Cited

U.S. PATENT DOCUMENTS

| 6,193,383 B1* | 2/2001 | Onikiri ................. F21V 7/0091 362/23.15 |
| 6,612,722 B2 | 9/2003 | Ryu et al. |
| 6,834,973 B2 | 12/2004 | Ohkawa |
| 7,206,040 B2 | 4/2007 | Kano |
| 2010/0007821 A1* | 1/2010 | Choi ...................... G02B 5/021 349/64 |
| 2011/0110116 A1* | 5/2011 | Peiler ................... G02B 6/0036 362/612 |
| 2012/0069575 A1* | 3/2012 | Koh ..................... G02B 6/0021 362/296.01 |

* cited by examiner

*Primary Examiner* — Julie Bannan

(57) ABSTRACT

A light guide assembly for an instrument display includes a light housing, a light source and a light guide. The light guide directs light from the light source through an opening in the light housing, and includes at least a first branch and a second branch. A diffuser is disposed above an opening in the light housing. The diffuser includes a bottom surface facing an interior of the light housing and a top surface facing opposite the bottom surface. A dimming feature is disposed on a portion of the top surface of the diffuser, such that the dimming feature reduces a brightness of the portion of the top surface thereby maintaining at least approximately a constant brightness across the diffuser.

13 Claims, 3 Drawing Sheets

LIGHT GUIDE ASSEMBLY FOR DISPLAY ILLUMINATION

TECHNICAL FIELD

The present disclosure relates generally to a light housing for an instrument cluster, and more particularly to a light housing including a centralized light source.

BACKGROUND

Traditional approaches to illuminating an instrument cluster include positioning a light housing (alternately referred to as a light box) and a diffuser behind the instrument cluster, thereby illuminating the instrument cluster. The light housing contains a light guide that redirects light from a light source behind the light housing, such as an LED, throughout the light housing. As the light travels along the light guide, the light escapes the light guide at various points thereby distributing the light throughout the light housing. A diffuser is placed covering a forward facing opening of the light housing and further diffuses the light escaping from the light guide.

Due to the nature of light guides, a typical light housing diffuser includes bright portions and dim portions, with the brightest portions of the diffuser being closest to the light source, and the dimmest portions of the diffuser being farthest from the light source. In order to compensate for the increased brightness nearest the light source, a darkening color is screen printed on the diffuser nearest the light source to reduce the light allowed to pass through the diffuser. The printing allows for a more even distribution of the light passing through the diffuser, but at the cost of a decreased total magnitude of light.

An alternate solution for removing or reducing the bright areas has been a distribution of micro lenses on the top (exterior facing) surface of the diffuser. The micro lenses provide a similar effect and distribute the light more evenly. As with the screen printing, the micro-lenses also reduce the magnitude of light passing through the diffuser resulting in an overall dimmer lighting.

SUMMARY OF THE INVENTION

Disclosed is a light guide assembly for an instrument display including a light housing, a light source, a light guide directing light from the light source through an opening in the light housing, wherein the light guide comprises at least a first branch and a second branch, a diffuser disposed above an opening in the light housing, wherein the diffuser includes a bottom surface facing an interior of said light housing and a top surface facing opposite said bottom surface, and a dimming feature disposed on a portion of the top surface of the diffuser, such that the dimming feature reduces a brightness of the portion of the top surface thereby maintaining at least approximately a constant brightness across said diffuser.

Also disclosed is a method for reducing uneven light disbursement through a diffuser including passing light through a plurality of clear protrusions disposed on a surface of a light box diffuser, thereby dimming the light passing through the protrusions, wherein the protrusions are disposed in a bright spot of the diffuser.

Also disclosed is a diffuser for a light guide assembly including an outward facing surface and an inward facing surface opposite said outward facing surface, an inner portion of said outward facing surface including a center of said outward facing surface, an outer portion of said inward facing surface approaching an edge of said outward facing surface, a plurality of clear protrusions disposed on said inner portion of said outward facing surface, wherein the clear protrusions are operable to redirect light passing through the diffuser at the inner portion thereby providing a dimming effect.

These and other features of the present invention can be best understood from the following specification and drawings, the following of which is a brief description.

DETAILED DESCRIPTION OF AN EMBODIMENT

Figure 1:
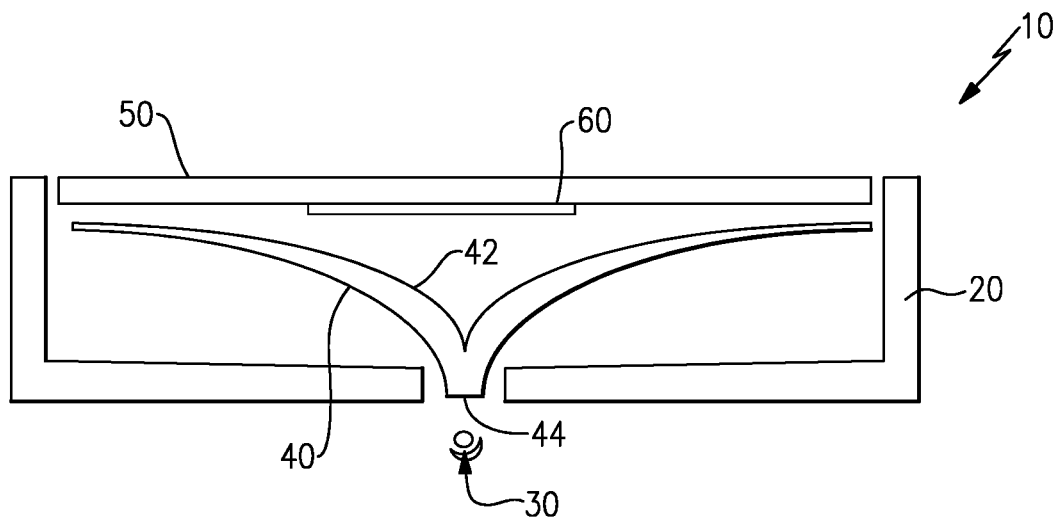
FIG. 1 schematically illustrates a light housing assembly utilizing a centralized light source.

FIG. 1 schematically illustrates a cross sectional view of a light housing assembly 10 including an opaque light box 20. Disposed within the light box 20 is a light guide 40. The light guide 40 includes a reflecting surface 42 that reflects light along the length of the light guide 40. The light guide 40 also includes a light receiving surface 44. The light receiving surface 44 is disposed adjacent to and facing a light source 30, such as an LED. When the light source 30 emits light, the light enters the light guide 40 through the light receiving surface 44 and is reflected along the light guide 40.

As the light is reflected along the light guide 40, light escapes from the light guide 40. The opaque light box 20 reflects light and prevents light from escaping the light housing assembly 10 other than through an opening covered by the diffuser 50. Furthermore, light traveling approximately perpendicular to the diffuser 50 appears brighter to an observer than light traveling approximately parallel to the diffuser 50. As a result of the curvature of the light guide 40, the light escaping the light guide 40 in the center of the light housing assembly 10, and passing through a center region of the diffuser 50, appears brighter to an observer. Similarly, the light escaping the light guide 40 at the extremities of the light guide 40 is traveling at near parallel to the diffuser 50, and appears dimmer to an observer.

In order to address these variations in brightness across different regions of the light diffuser 50, current systems print a semi-transparent layer 60 on one surface of the diffuser 50. The semi-transparent layer 60 prevents a percentage of light contacting the semi-transparent layer 60 from passing through the diffuser 50, thereby reducing the perceived brightness of the light. Utilization of the screen printing technique does not enhance the light passing through the edges and reduces the brightness of the light passing through the diffuser 50 by a set amount in each region.

Figure 2:
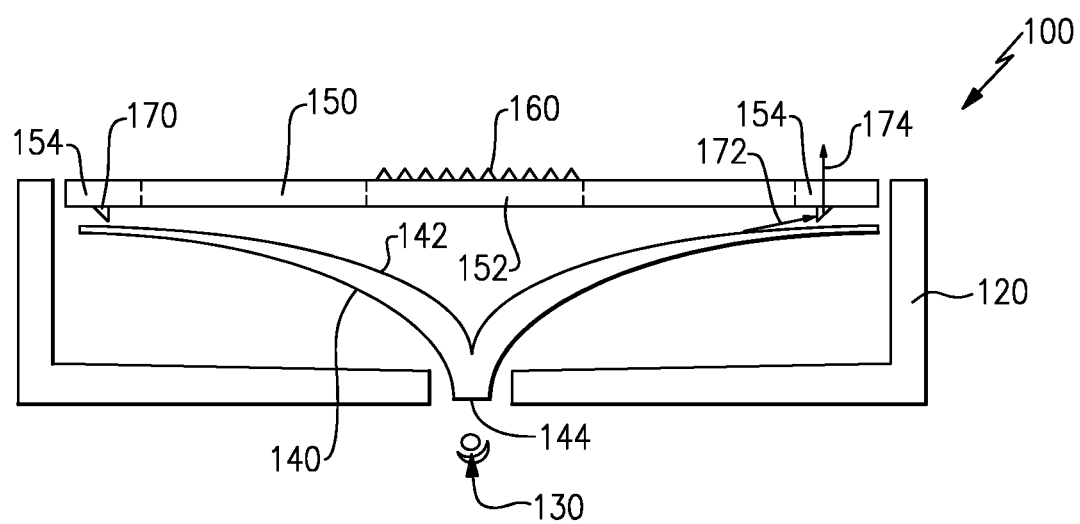
FIG. 2 schematically illustrates a light housing assembly including a diffuser dimming feature.

With continued reference to FIG. 1, and with like numerals indicating like elements, FIG. 2 schematically illustrates an example light housing assembly 100. As with the example of FIG. 1, the light housing assembly 100 includes a light box 120 and a light guide 140 disposed within the light box 120. The light guide 140 includes a reflecting surface 142 for reflecting light along the light guide 140 and a light receiving surface 144 for admitting light into the light guide 140. The light receiving surface 144 is disposed adjacent to, and facing, a light source 130. As with the example of FIG. 1, light enters the light guide 140 through the light receiving surface 144 and is directed along the light guide 140.

A diffuser 150 is positioned at an opening in the light box 120 and diffuses light exiting the light box 120. The diffuser 150 includes three portions, a center portion 152, a middle portion 151 and an outer portion 154. While described herein as discrete portions for explanatory purposes, one of skill in the art will understand that the diffuser portions 151, 152, 154 can include transitions between the adjacent portions 151, 152, 154 instead of a discrete boundary.

The light exiting the light box 120 in the center portion 152 is substantially perpendicular to the diffuser 150 resulting in a bright spot in the center portion 152 relative to a remainder of the diffuser 150. As the light is directed along the light guide 140 by the reflecting surface 142, the direction of travel of the light is altered. When light 172 exits the light guide 140 at an end of the light guide 140, the light 172 is traveling in a substantially parallel direction to the diffuser 150. Absent other features, such as a light enhancement prism 170, this results in the outer portion 154 of the diffuser being dimmer than the remainder of the diffuser 150.

In order to reduce the perceived brightness of the center portion 152, multiple clear protrusions are disposed on the surface of the diffuser 150 within the center region. In one example, each of the protrusions 160 is a pyramid shaped prism. The protrusions 150 redirect a portion of the light passing through the protrusions 160 such that the redirected light is no longer traveling substantially perpendicular to the diffuser 150. As a result of this redirection, the light appears dimmer to an observer.

Figure 5A:
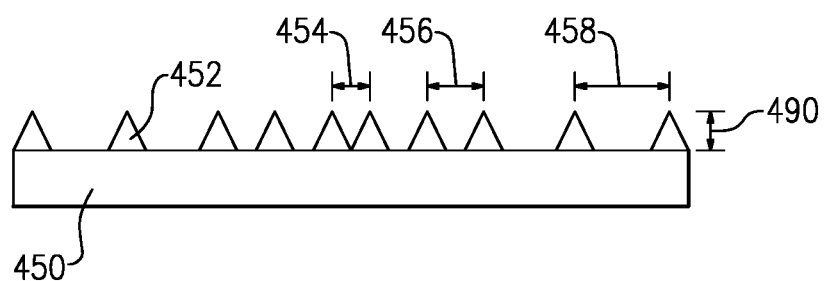
FIG. 5A schematically illustrates a first example arrangement of dimming features on a diffuser.
Figure 5B:
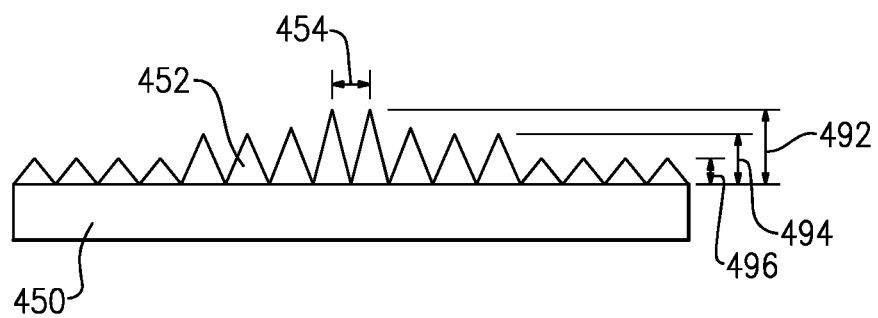
FIG. 5B schematically illustrates a second example arrangement of dimming features on a diffuser.

While illustrated in the example of FIG. 2 as a set of identical, evenly distributed, pyramid prisms, one of skill in the art will understand that the protrusions 160 can be spaced apart, created with varied features, or both in order to achieve a gradient dimming effect rather than a uniform dimming effect across the entire center portion 152. Examples of such arrangements are illustrated in FIGS. 5A and 5B and described below.

In order to enhance the light exiting the diffuser 150 at the outer portion 154, a prism 170 is disposed on the inner surface of the diffuser 150. When light 172, traveling substantially parallel to the diffuser 150, exits the light guide 140, the light 172 enters the prism 170. The prism 170 then redirects the light 172 into light 174 traveling substantially parallel to the diffuser 150. The redirected light 174 is passed through the diffuser 150 and exits the light box 120. Because the light 174 is substantially perpendicular to the diffuser, the light 174 will appear brighter to an observer. In this way, the brightness of the light exiting the light guide 140 at the outer portions 154 is enhanced by the prisms 170.

While illustrated in the example of FIG. 2 as a single prism 170 at each of the outer portions, it is understood that multiple prisms 170 can be used to the same effect, with the prisms 170 being arranged and spaced for optimal brightness enhancing. One of skill in the art, having the benefit of this disclosure, will be able to determine the optimal arrangement of prisms 170 in the outer portions 154 based on the needs and constraints of a given light box 120 application.

Figure 3:
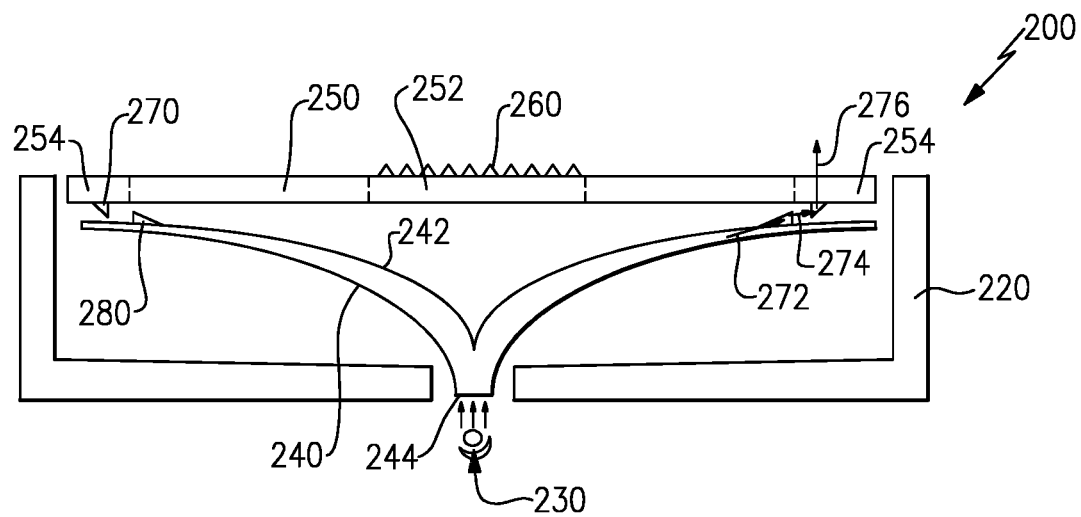
FIG. 3 schematically illustrates an alternate light housing assembly including a diffuser dimming feature.

With continued reference to FIGS. 1 and 2, and with like numerals indicating like elements, FIG. 3 schematically illustrates an example light housing assembly 200, including an additional brightness enhancing prism 280 at the outer edges of a light guide 240. As with the example of FIG. 2, the light housing assembly 200 includes a light box 220 and a light guide 240 disposed within the light box 220. The light guide 240 includes a reflecting surface 242 for reflecting light along the light guide 240 and a light receiving surface 244. The light receiving surface 244 is disposed adjacent to, and facing, a light source 230. Light enters the light guide 240 through the light receiving surface 244 and is directed along the light guide 240.

A diffuser 250 is positioned at an opening in the light box 220 and diffuses light exiting the light box 220. The diffuser 250 includes three portions, a center portion 252, a middle portion 251 and an outer portion 254. While described herein as discrete portions for explanatory purposes, one of skill in the art having the benefit of this disclosure will understand that the diffuser portions can include transitions between the adjacent portions 251, 252, 254 instead of a discrete boundary.

The diffuser 250 includes clear protrusions 260 disposed in the center portion 252 in the same manner, and providing the same effect as, the clear protrusions 160 illustrated in the example of FIG. 2.

Disposed on each of the outer potions 254 of the diffuser are prisms 270, arranged in a similar manner to the prisms 170 in the example of FIG. 2. Further increasing the brightness enhancing effect in the example of FIG. 3, is the disposition of additional prims 280 on a forward facing surface of each end of the light guide 240. As stated previously, light 272 exits the light guide 240 in a direction substantially parallel to the diffuser 250. The light 272 encounters the prism 280 disposed on the light guide 240, and is redirected by the prism 280 into light 274 that is traveling directly toward the prism 270 disposed on the interior surface of the diffuser 250 in the outer portion 254. The prism 270 redirects the light 274 into light traveling substantially parallel to the diffuser 250.

The presence of the additional prisms 280 on the light guide 240 increase the magnitude of light 274 entering the prisms 280 disposed on the inner surface of the diffuser 250, relative to the example of FIG. 2. The increased magnitude of light entering the prism 280 increases the amount of light 276 that is redirected by the prisms 270, thereby resulting in a the outer portion 254 having a brighter appearance to an observer. As with the prisms 270, the prisms 280 can be multiple prisms instead of the singular illustrated prisms 280. One of skill in the art, having the benefit of this disclosure, is able to determine an appropriate quantity and arrangement of prisms 280 for a given application.

Figure 4:
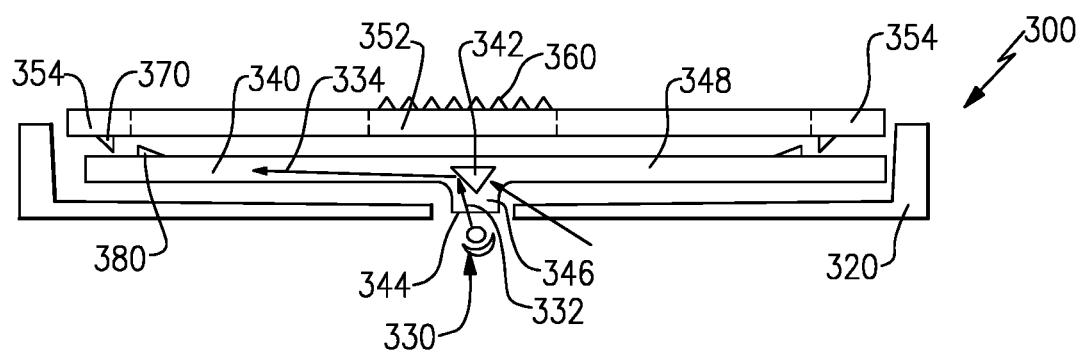
FIG. 4 schematically illustrates an example light housing assembly including a T-shaped light guide.

With continued reference to FIGS. 1-3, FIG. 4 schematically illustrates an alternative light guide housing assembly 300. The alternative light guide housing assembly 300 includes a light box 320 and a light guide 340 disposed in the light box 320. The light guide 340 of FIG. 4 is a T-shaped light guide 340 including a receiving arm 346 connected to the approximate center of a guiding arm 348. A light source 330 shines light on a light receiving surface 344 of the receiving arm 346, thereby allowing light to enter the light guide 340. A prism 342 is disposed at the junction between the receiving arm 346 and the guiding arm 348. As light 332 from the light source 330 enters the light receiving arm of the light guide 340, the light encounters the prism 342. The prism 342 then redirects the light 334 down the light guide arm 348 in either direction, depending on which side of the prism 342 the light 332 from the light source 330 strikes.

The diffuser 360 includes clear protrusions in a center portion 352 on the exterior surface, and prisms 370 on the interior surface of the outer portions 354. The protrusions 360 and the prisms 370, 380 operate in the same manner as described above with regards to FIGS. 1-3.

With continued reference to FIGS. 1-4, and with like numerals indicating like elements, FIG. 5A illustrates an example center portion of a diffuser 450 with a first arrangement of protrusions 452. Each of the protrusions 452 in the illustrated example is a uniform height 490 away from the diffuser 450. Furthermore, each of the protrusions 452 has a uniform base size. Thus, each of the protrusions 452 are identical structures. In order to provide a gradient dimming effect on the light passing through the diffuser 450, the distribution of the protrusions 452 is denser towards the center of the diffuser 450 and less dense at the edges of the diffuser 450. In other words, a distance 454 between each protrusion 452 and the adjacent protrusions 452 is smallest at the center of the diffuser 450, a distance 456 between each protrusion 452 and the adjacent protrusions 452 is intermediate midway between the center of the diffuser 450 and the edge of the diffuser 450, and a distance 458 between each protrusion 452 and the adjacent protrusions 452 is the longest at the edge of the diffuser 450.

By reducing the density of the protrusions 452 as the protrusions 452 approach the edges of the diffuser 450, the amount by which the light passing through the diffuser 450 is dimmed is reduced in a gradient approaching the edges of the diffuser 450. Thus, the brightest area of the diffuser 450 (the center) is dimmed the most.

FIG. 5B illustrates an alternate method of achieving a similar dimming gradient effect achieved by the example of FIG. 5A. In contrast to the example of FIG. 5A, each of the protrusions 452 is the same distance away from each other of the protrusions 452 and the protrusions 452 have varied height dimensions with uniform base widths. In the example of FIG. 5B the centermost protrusions 452 have a tallest height 492, the intermediate protrusions have an intermediate height 494, and the outermost protrusions have a shortest height 496. Additional heights 492, 494, 496 can be interspersed with the heights of the protrusions 452 decreasing as the protrusions are farther away from the center of the diffuser 450.

The effect of the altered height dimension with a uniform base dimension is to alter the angles on the sides of the protrusions 452, with the larger the height, the steeper the angle. A steeper angle redirects more light away from perpendicular to the diffuser 450. Thus, the greater the height, the greater the dimming effect of the protrusions. By decreasing the height as the protrusions 452 move further away from the center of the diffuser 450, the dimming effect is decreased, achieving a dimming gradient. In alternate examples, the protrusions 452 can have varied heights and base sizes. In alternate examples, the angles of the walls of the protrusions are controlled to achieve the above describe gradient effect. In further examples, the features of FIG. 5A and FIG. 5B can be incorporated together to further enhance the dimming effect.

While each of the above examples describes the utilization of a pyramid shaped prism as the clear protrusion from the diffuser, it is understood that alternate shaped prisms could also be used to similar effect.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A light guide assembly for an instrument display comprising:
    a light housing;
    a light source;
    a light guide directing light from the light source through an opening in the light housing, wherein the light guide comprises at least a first branch and a second branch;
    a diffuser disposed above an opening in the light housing, wherein the diffuser includes a bottom surface facing an interior of said light housing and a top surface facing opposite said bottom surface; and
    a dimming feature including a plurality of clear protrusions, the dimming feature being disposed on a portion of the top surface of the diffuser, such that the dimming feature reduces a brightness of the portion of the top surface thereby maintaining at least approximately a constant brightness across said diffuser; and
    wherein each of said clear protrusions is a pyramid shaped prism operable to reduce an amount of light passing through said diffuser in a direction perpendicular to said top surface; and
    a plurality of light enhancing features disposed on an exterior edge portion of the bottom surface of the diffuser such that a brightness of light from said light guide passing through the exterior edge portion of the diffuser is increased.

2. The light guide assembly of claim 1, wherein the light enhancing features are wedge shaped prisms operable to reflect light such that light traveling approximately parallel to said diffuser is directed approximately perpendicular to the diffuser, thereby increasing an intensity of light passing through the diffuser.

3. The light guide assembly of claim 1, further comprising a plurality of light guide prisms disposed on said light guide, wherein each of said plurality of light guide prisms is paired with a corresponding wedge shaped prism such that light from said light guide is directed to said corresponding wedge shaped prism.

4. The light guide assembly of claim 1, wherein the light guide comprises a single piece having a central surface for receiving light from the light source, and at least two arms branching from said central surface, wherein each of said branching arms include a reflecting surface operable to direct light from said light source along said branching arms.

5. The light guide assembly of claim 1, wherein the light guide comprises
    a T-shaped profile with a light receiving arm coupled to a light guide arm at approximately the center of the light guide arm; and
    a prism disposed at a junction between said light receiving arm and said light guide arm, wherein said prism is operable to communicate light received at said light receiving arm along said light guide arm.

6. A light guide assembly for an instrument display comprising:
    a light housing;
    a light source;
    a light guide directing light from the light source through an opening in the light housing, wherein the light guide comprises at least a first branch and a second branch;

a diffuser disposed above an opening in the light housing, wherein the diffuser includes a bottom surface facing an interior of said light housing and a top surface facing opposite said bottom surface;

a dimming feature including a plurality of clear protrusions said plurality of clear protrusions being a uniform shape and a uniform size, the dimming feature being disposed on a portion of the top surface of the diffuser, such that the dimming feature reduces a brightness of the portion of the top surface thereby maintaining at least approximately a constant brightness across said diffuser; and wherein each of said clear protrusions is a pyramid shaped prism operable to reduce an amount of light passing through said diffuser in a direction perpendicular to said top surface; and wherein a distribution of said plurality of protrusions decreases in density as the plurality of protrusions are located farther from a center of said diffuser, and wherein a perceived dimming effect of said protrusions is dependent upon the density of the protrusion distribution.

7. A light guide assembly for an instrument display comprising:

a light housing;

a light source;

a light guide directing light from the light source through an opening in the light housing, wherein the light guide comprises at least a first branch and a second branch;

a diffuser disposed above an opening in the light housing, wherein the diffuser includes a bottom surface facing an interior of said light housing and a top surface facing opposite said bottom surface; and a dimming feature including a plurality of clear protrusions, wherein the plurality of clear protrusions have varied dimensions such that an amount of light redirected by each protrusion is decreased relative to the protrusions distance from a center of the diffuser, thereby achieving a dimming gradient, the dimming feature being disposed on a portion of the top surface of the diffuser, such that the dimming feature reduces a brightness of the portion of the top surface thereby maintaining at least approximately a constant brightness across said diffuser; and wherein each of said clear protrusions is a pyramid shaped prism operable to reduce an amount of light passing through said diffuser in a direction perpendicular to said top surface.

8. A method for reducing uneven light disbursement through a diffuser comprising:

passing light through a plurality of clear protrusions disposed on an exterior surface of a light box diffuser, thereby dimming the light passing through the protrusions, wherein the protrusions are disposed on a bright spot of the diffuser, and wherein each of said clear protrusions is a pyramid shaped prism operable to reduce an amount of light passing through said diffuser in a direction perpendicular to said surface; and passing light escaping a light guide through a plurality of light enhancing prisms disposed on an outer portion of an interior facing surface of the diffuser, thereby increasing a brightness of light passing through the diffuser at the light enhancing prism, wherein the light enhancing prism is disposed on an outer edge of the diffuser.

9. The method of claim 8, further comprising passing a portion of the light escaping the light guide through a light guide prism, thereby directing the light passed through the light guide prism to the at least one light enhancing prism.

10. The method of claim 8, wherein the clear protrusions are dimensioned and disposed such that a dimming effect produced by the clear protrusions is a gradient dimming effect.

11. A diffuser for a light guide assembly comprising:

an outward facing surface and an inward facing surface opposite said outward facing surface;

an center portion of said outward facing surface including a center of said outward facing surface;

an outer portion of said inward facing surface approaching an edge of said outward facing surface;

a plurality of clear protrusions disposed on said center portion of said outward facing surface, wherein the clear protrusions are operable to redirect light passing through the diffuser at the center portion thereby providing a dimming effect; and a plurality of prisms disposed on said outer portion of said inward facing surface, wherein each of said plurality of prisms is operable to redirect light passing through the diffuser at the outer portion such that the light is substantially perpendicular to the diffuser, thereby enhancing a brightness of the light.

12. The diffuser of claim 11, wherein said plurality of clear protrusions comprises protrusions having uniform dimensions and a gradient of placement density, thereby providing a greater dimming effect at a center of the center portion and a lesser dimming effect and an edge of the center portion.

13. The diffuser of claim 11, wherein said plurality of clear protrusions comprises protrusions having a gradient dimensions and a uniform placement density, and wherein clear protrusions disposed near the center of the center portion provide a greater dimming effect and protrusions near an edge of the center portion provide a lesser dimming effect.

* * * * *

UNITED STATES PATENT AND TRADEMARK OFFICE
CERTIFICATE OF CORRECTION

PATENT NO. : 9,632,230 B2
APPLICATION NO. : 14/269680
DATED : April 25, 2017
INVENTOR(S) : Vyacheslav Borisovich Birman and Richard Daniel Sanders It is certified that error appears in the above-identified patent and that said Letters Patent is hereby corrected as shown below:

In the Claims

In Claim 5, Column 6, Line 55; after "approximately" replace "the center" with --a center--

In Claim 11, Column 8, Line 24; before "center portion" replace "an" with --a--

In Claim 12, Column 8, Line 43; after "dimming effect" replace "and an" with --at an--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*